United States Patent
Borthwick et al.

(10) Patent No.: US 10,476,224 B2
(45) Date of Patent: Nov. 12, 2019

(54) OPTICAL APPARATUS

(71) Applicant: Thales Holdings UK Plc, Surrey (GB)

(72) Inventors: Andrew Borthwick, Glasgow (GB); Stephen Lee, Glasgow (GB)

(73) Assignee: THALES HOLDINGS UK PLC, Berkshire (GB)

( * ) Notice: Subject to any disclaimer, the term of this patent is extended or adjusted under 35 U.S.C. 154(b) by 174 days.

(21) Appl. No.: 15/178,756

(22) Filed: Jun. 10, 2016

(65) Prior Publication Data
US 2016/0365698 A1 Dec. 15, 2016

(30) Foreign Application Priority Data

Jun. 12, 2015 (GB) .................................... 1510258.5

(51) Int. Cl.
*H01S 3/10* (2006.01)
*H01S 3/081* (2006.01)
(Continued)

(52) U.S. Cl.
CPC ............ *H01S 3/0811* (2013.01); *H01S 3/005* (2013.01); *H01S 3/081* (2013.01); *H01S 3/0815* (2013.01);
(Continued)

(58) Field of Classification Search
CPC .. H01S 3/08113; H01S 3/005; H01S 3/08054; H01S 3/081; H01S 3/0815; H01S 3/1095; H01S 3/0813; H01S 3/08; H01S 3/08004; H01S 3/1124; H01S 3/115; H01S 3/08059; H01S 3/08063; H01S 3/0823; H01S 3/10; H01S 3/1106; H01S 3/11; H01S 3/1115; H01S 3/113; H01S 3/08036; H01S 3/086; H01S 3/091; H01S 3/05; H01S 3/08022; H01S 3/0816; H01S 3/083;
(Continued)

(56) References Cited

U.S. PATENT DOCUMENTS 3,969,687 A 7/1976 Freiberg et al.
4,164,366 A * 8/1979 Sziklas .................... H01S 3/07
359/859

(Continued)

FOREIGN PATENT DOCUMENTS

EP 0339868 A1 11/1989

OTHER PUBLICATIONS

Extended European Search Report for EP Application No. 16173818, dated Nov. 11, 2016.
(Continued)

*Primary Examiner* — Jessica S Manno
*Assistant Examiner* — Delma R. Fordé
(74) *Attorney, Agent, or Firm* — Hauptman Ham, LLP

(57) ABSTRACT

An optical apparatus comprises an optical resonator defining an optical resonator path for an optical resonator beam and an optical beam expander optically coupled to the optical resonator, the optical beam expander defining an optical beam expander path for an optical beam expander beam. The optical resonator path and the optical beam expander path may be configured such that the optical resonator beam and the optical beam expander beam at least partially intersect. Such an optical apparatus may be configured for use as a laser target designator or a laser range finder.

21 Claims, 5 Drawing Sheets

(51) Int. Cl.
*H01S 3/00* (2006.01)
*H01S 3/08* (2006.01)
*H01S 3/109* (2006.01)

(52) U.S. Cl.
CPC ........ *H01S 3/08054* (2013.01); *H01S 3/1095* (2013.01)

(58) Field of Classification Search
CPC ...... H01S 3/0817; H01S 3/1071; H01S 3/076; G02B 27/09; G02B 27/0911; G02B 27/0972; G02B 27/08
See application file for complete search history.

(56) References Cited

U.S. PATENT DOCUMENTS

| | | | | |
|---|---|---|---|---|
| 4,190,814 A | * | 2/1980 | Van Workum | H01S 3/0818 359/859 |
| 4,518,232 A | * | 5/1985 | Dagenais | B23K 26/073 219/121.74 |
| 4,613,206 A | * | 9/1986 | Franchetti | B23K 26/0604 219/121.74 |
| 4,949,358 A | * | 8/1990 | Kantorski | H01S 3/083 372/101 |
| 5,043,998 A | * | 8/1991 | Cooper | H01S 3/0818 372/103 |
| 5,317,589 A | | 5/1994 | Ogawa et al. | |
| 6,512,781 B1 | * | 1/2003 | Borstel | H01S 3/0805 372/103 |
| 2003/0151732 A1 | | 8/2003 | Rogers et al. | |
| 2006/0159150 A1 | * | 7/2006 | Nikolaus | H01S 3/1055 372/98 |
| 2008/0117948 A1 | | 5/2008 | Wakabayashi | |
| 2010/0108913 A1 | * | 5/2010 | Ershov | H01S 3/225 250/492.1 |
| 2016/0365698 A1 | * | 12/2016 | Borthwick | H01S 3/08054 |
| 2017/0168143 A1 | * | 6/2017 | Rezk | G01S 7/4812 |

OTHER PUBLICATIONS

Combined Search Report and Examination Report for GB Application No. 1510258.5, dated Jan. 11, 2016.

* cited by examiner

OPTICAL APPARATUS

This application claims priority benefit to United Kingdom Application No. GB 1510258.5, filed Jun. 12, 2015, which is hereby incorporated herein by reference in its entirety.

FIELD

Embodiments described herein relate generally to an optical apparatus.

BACKGROUND

A laser apparatus which is designed to illuminate, designate or interrogate a distant target, may require low beam divergence to retain the intensity of the optical beam incident on the target. Accordingly, it is known to use a beam expander such as a beam expanding telescope to reduce the divergence of a beam output from a laser apparatus.

BRIEF DESCRIPTION OF THE DRAWINGS

Embodiments will now be described by way of non-limiting example only with reference to the following drawings of which.

DETAILED DESCRIPTION OF THE DRAWINGS

Figure 1C:
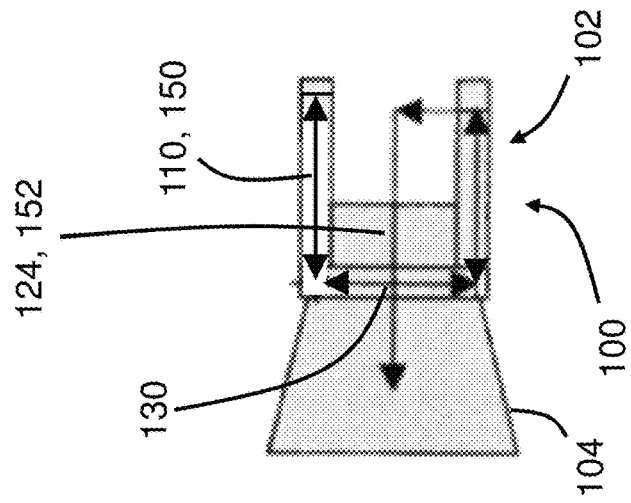
FIG. 1(c) is a schematic plan view of a first embodiment of an optical apparatus.

It should be understood that one or more of the features of any of the following aspects or embodiments may apply alone or in any combination in relation to any of the other aspects or embodiments.

According to an aspect or an embodiment there is provided an optical apparatus comprising:

an optical resonator defining an optical resonator path for an optical resonator beam; and an optical beam expander for expanding an optical beam output from the optical resonator, the optical beam expander defining an optical beam expander path for a divergent optical beam expander beam, wherein the optical resonator path and the optical beam expander path are configured such that the optical resonator beam and the optical beam expander beam at least partially intersect.

The optical resonator path and the optical beam expander path may define a non-zero angle therebetween.

The optical resonator path and the optical beam expander path may be perpendicular.

The optical resonator path may be geometrically non-linear.

The optical resonator path may be generally U-shaped.

The optical resonator path may define a continuous loop for the optical resonator beam. The optical resonator may, for example, comprise or be a ring resonator.

The optical resonator may comprise a high reflector for reflecting the optical resonator beam.

The high reflector may comprise a highly reflecting mirror. The optical resonator may comprise an output coupler for coupling a proportion of the power from the optical resonator beam so as to form an optical resonator output beam for coupling to the optical beam expander.

The output coupler may comprise at least one of a mirror, a prism, a beam splitter, a polariser and a retarder.

The output coupler may comprise a partially reflecting mirror.

The reflecting surface of the output coupler may be coplanar with a reflecting surface of the high reflector.

The optical resonator path may be folded.

The optical resonator may comprise a retroreflector for folding the optical resonator path. For example, the optical resonator may comprise a corner cube for folding the optical resonator path.

The optical resonator may be configured so that the reflecting surfaces of the output coupler and the high reflector are coplanar and the retroreflector opposes the reflecting surfaces of the output coupler and the high reflector. Such an optical resonator may be relatively insensitive to any misalignment between the retroreflector and the output coupler and the high reflector. Such an optical resonator may be relatively stable against any relative movement between the retroreflector and the output coupler and the high reflector.

The optical resonator may comprise at least one beam re-direction arrangement for changing a direction of the optical resonator beam.

Each beam re-direction arrangement may be refractive and/or reflective.

Each beam re-direction arrangement may comprise a mirror or a prism.

The optical resonator may comprise a first beam re-direction arrangement for re-directing the optical resonator beam through 90°. The optical resonator may comprise a second beam re-direction arrangement for re-directing the optical resonator beam through a further 90°.

The optical resonator may be configured so that each beam re-direction arrangement re-directs the optical resonator beam through a first angle when the optical resonator beam is travelling in a forward direction and each beam re-direction arrangement re-directs the optical resonator beam through a second angle when the optical resonator beam is travelling in a reverse direction, wherein the second angle is equal to the first angle. The optical resonator beam may, for example, travel towards the retroreflector in the forward direction and travel away from the retroreflector in the reverse direction. Each beam re-direction arrangement may define a planar reflecting surface with the optical resonator beam being incident upon a first area of the reflecting surface in the forward direction and the optical resonator beam being incident upon a second area of the reflecting surface in the reverse direction. Such an optical resonator may be relatively insensitive to any misalignment or may be relatively stable compared to an optical resonator which relies upon the use of separate reflecting surfaces to reflect the optical resonator beam in the forward and reverse directions.

The optical resonator may comprise a Porro prism.

The optical resonator may comprise a pair of Porro prisms. Each Porro prism may have a roofline. The roofline of each Porro prism may be arranged at a predetermined angle relative to the roofline of the other Porro prism. The roofline of each Porro prism may be arranged at a predetermined angle relative to a plane of polarisation of the optical resonator beam. The rooflines of the Porro prisms may be arranged so as to be parallel to one another. The rooflines of the Porro prisms may be arranged so as to be perpendicular to one another. The Porro prisms may then said to be "crossed". The rooflines of the Porro prisms may be arranged at an angle of between 0° and 90° relative to one another. The Porro prisms may be crossed.

The output coupler may comprise a beam splitter.

The output coupler may comprise a polarising beam splitter.

The optical beam expander may comprise an input optical arrangement and an output optical arrangement.

The input optical arrangement of the optical beam expander may be optically coupled to the optical resonator so as to receive an optical beam output from the optical resonator.

The input optical arrangement of the optical beam expander may be optically coupled to the output coupler of the optical resonator.

The output optical arrangement of the optical beam expander may be configured for transmission of an optical output beam from the optical apparatus towards an object or a target.

The input optical arrangement of the optical beam expander may be located within a space which is at least partially defined by, or at least partially delimited by, the optical resonator path, and the output optical arrangement of the optical beam expander may be located outside the space.

The input optical arrangement of the optical beam expander may comprise one or more refractive optical elements and/or one or more reflective optical elements.

The output optical arrangement of the optical beam expander may comprise one or more refractive optical elements and/or one or more reflective optical elements.

The input optical arrangement of the optical beam expander may comprise an eyepiece lens arrangement.

The output optical arrangement of the optical beam expander may comprise an objective lens arrangement.

The optical beam expander may comprise a beam expanding telescope.

The optical beam expander may comprise an optical focus adjustment arrangement for adjusting the convergence and/or divergence of an optical output beam emitted by the optical apparatus.

The optical beam expander may comprise a boresight adjustment optical element. A boresight adjustment optical element may allow the removal of any boresight errors between the direction of travel of an output beam and an external reference datum such as an external reference datum provided by a mechanical mount used for the optical apparatus.

The optical apparatus may comprise an optical coupling arrangement between the optical resonator and the optical beam expander for coupling light output from the optical resonator to the beam expander.

The optical coupling arrangement may be configured to image an optical field at the output coupler of the optical resonator to an optical field at the input optical arrangement of the beam expander.

The optical coupling arrangement may be provided separately from an output coupler of the optical resonator.

The optical coupling arrangement may be provided integrally with an output coupler of the optical resonator.

The optical coupling arrangement may comprise a beam folding arrangement.

The beam folding arrangement may be configured to fold the optical resonator output beam through 180°.

The beam folding arrangement may comprise a beam folding prism having a input surface area and an output surface area, the input surface area being configured so as to define the output coupler of the optical resonator.

The input surface area may have a partially reflective coating formed thereon.

The output surface area may be configured so as to at least partially suppress reflections of an optical resonator output beam.

The output surface area may have an anti-reflective coating formed thereon.

The input surface area and the output surface area may be defined on the same surface of the beam folding prism.

The input surface area and the output surface area may be co-planar.

The optical apparatus may comprise an optical detector for detecting light received by the optical apparatus.

The optical apparatus may comprise a beam splitter arrangement located between the optical resonator and the beam expander.

The beam splitter arrangement may be configured to direct light from the optical resonator towards the optical beam expander and to direct light from the optical beam expander towards the optical detector.

The beam splitter arrangement may comprise a polarising beam splitter.

The optical apparatus may comprise a waveplate located between the optical resonator and the polarising beam splitter.

The waveplate may define a retardance which is selected to match a polarisation state of the light output from the optical resonator to a desired polarisation state required for transmission of the light through the polarising beam splitter.

The optical apparatus may comprise a quarter waveplate located between the beam splitter arrangement and the optical beam expander.

The optical apparatus may comprise a controller configured to analyse a signal provided by the optical detector.

The optical resonator may comprise a laser.

The optical resonator may comprise an optical gain medium.

The optical gain medium may comprise a solid-state medium and/or a gaseous medium.

The optical gain medium may be configured to be optically pumped and/or electrically pumped.

The optical resonator may comprise a pump laser for pumping the optical gain medium. The pump laser may comprise a semiconductor laser diode.

The optical resonator may comprise a pulsed laser and/or a continuous-wave (CW) laser.

The optical resonator may be configured for Q-switching, gain-switching, and mode-locking.

The optical resonator may comprise a Q-switch. The optical resonator may comprise a saturable absorber.

The optical apparatus may be portable.

The optical apparatus may be configured to be hand-held.

The optical apparatus may be a laser target designator.

The optical apparatus may be a laser range finder. According to an aspect or an embodiment there is provided an optical apparatus comprising:

an optical resonator defining an optical resonator path for an optical resonator beam; and an optical beam expander comprising an input optical arrangement which is optically coupled to an output of the optical resonator for expanding an optical beam output from the optical resonator, wherein the input optical arrangement of the optical beam expander is located within a space which is at least partially defined by the optical resonator path.

According to an aspect or an embodiment there is provided a laser target designator comprising:

an optical resonator defining an optical resonator path for an optical resonator beam; and an optical beam expander for expanding an optical beam output from the optical resonator, the optical beam expander defining an optical beam expander path for a divergent optical beam expander beam, wherein the optical resonator path and the optical beam expander path are configured such that the optical resonator beam and the optical beam expander beam at least partially intersect.

According to an aspect or an embodiment there is provided a laser range finder comprising:

an optical resonator defining an optical resonator path for an optical resonator beam; and an optical beam expander for expanding an optical beam output from the optical resonator, the optical beam expander defining an optical beam expander path for a divergent optical beam expander beam, wherein the optical resonator path and the optical beam expander path are configured such that the optical resonator beam and the optical beam expander beam at least partially intersect.

According to an aspect or an embodiment there is provided a laser target designator.

The laser target designator may comprise an optical resonator.

The optical resonator may define an optical resonator path for an optical resonator beam.

The laser target designator may comprise an optical beam expander.

The optical beam expander may be optically coupled to the optical resonator.

The optical beam expander may define an optical beam expander path for an optical beam expander beam.

The optical resonator path and the optical beam expander path may be configured such that the optical resonator beam and the optical beam expander beam at least partially intersect.

According to an aspect or an embodiment there is provided a laser range finder.

The laser range finder may comprise an optical resonator.

The optical resonator may define an optical resonator path for an optical resonator beam.

The laser range finder may comprise an optical beam expander.

The optical beam expander may be optically coupled to the optical resonator.

The optical beam expander may define an optical beam expander path for an optical beam expander beam.

The optical resonator path and the optical beam expander path may be configured such that the optical resonator beam and the optical beam expander beam at least partially intersect.

According to an aspect or an embodiment there is provided an optical apparatus.

The optical apparatus may comprise an optical resonator.

The optical resonator may define an optical resonator path for an optical resonator beam.

The optical apparatus may comprise an optical beam expander.

The optical beam expander may be optically coupled to the optical resonator.

The optical beam expander may comprise an input optical arrangement.

The input optical arrangement may be optically coupled to the optical resonator.

The input optical arrangement may be located within a space which is at least partially defined by the optical resonator path.

The input optical arrangement may be located within a space which is at least partially delimited by the optical resonator path.

The optical beam expander may comprise an output optical arrangement.

The output optical arrangement may be configured for transmission of an optical output beam from the optical apparatus towards an object or a target.

The output optical arrangement of the optical beam expander may be located outside the space.

The optical beam expander may define an optical beam expander path for an optical beam expander beam.

The optical resonator path and the optical beam expander path may be configured such that the optical resonator beam and the optical beam expander beam at least partially intersect.

The optical beam expander may be optically coupled to an output of the optical resonator.

The optical beam expander may be configured for expanding an optical beam output from the optical resonator.

The optical beam expander beam may be divergent.

According to an aspect or an embodiment there is provided an optical apparatus comprising:

an optical resonator defining an optical resonator path for an optical resonator beam; and an optical beam expander comprising an input optical arrangement which is optically coupled to the optical resonator, wherein the input optical arrangement is located within a space which is at least partially defined by the optical resonator path.

The optical beam expander may be optically coupled to an output of the optical resonator.

The optical beam expander may be configured for expanding an optical beam output from the optical resonator.

The optical beam expander beam may be divergent.

The input optical arrangement may be located within a space which is at least partially delimited by the optical resonator path.

The optical beam expander may comprise an output optical arrangement for transmission of an optical output beam from the optical apparatus towards an object or a target.

The output optical arrangement may be located outside the space.

The optical beam expander may define an optical beam expander path for an optical beam expander beam.

The optical resonator path and the optical beam expander path may be configured such that the optical resonator beam and the optical beam expander beam at least partially intersect.

According to an aspect or an embodiment there is provided an optical apparatus.

The optical apparatus may comprise an optical resonator.

The optical resonator may define an optical resonator path for an optical resonator beam.

The optical apparatus may comprise an optical beam expander.

The optical beam expander may be optically coupled to the optical resonator.

The optical beam expander may define an optical beam expander path for an optical beam expander beam.

The optical resonator path and the optical beam expander path may be configured such that the optical resonator beam and the optical beam expander beam at least partially intersect.

The optical beam expander may be optically coupled to an output of the optical resonator.

The optical beam expander may be configured for expanding an optical beam output from the optical resonator.

The optical beam expander beam may be divergent.

According to an aspect or an embodiment there is provided an optical apparatus comprising:

an optical resonator defining an optical resonator path for an optical resonator beam; and an optical beam expander optically coupled to the optical resonator, the optical beam expander defining an optical beam expander path for an optical beam expander beam, wherein the optical resonator path and the optical beam expander path are configured such that the optical resonator beam and the optical beam expander beam at least partially intersect.

The optical beam expander may be optically coupled to an output of the optical resonator.

The optical beam expander may be configured for expanding an optical beam output from the optical resonator.

The optical beam expander beam may be divergent.

Figure 1B:
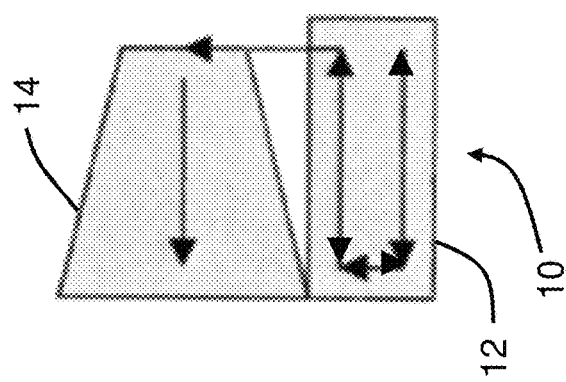
FIG. 1(b) is a schematic plan view of a known optical apparatus having a "side-by-side" arrangement.
Figure 1A:
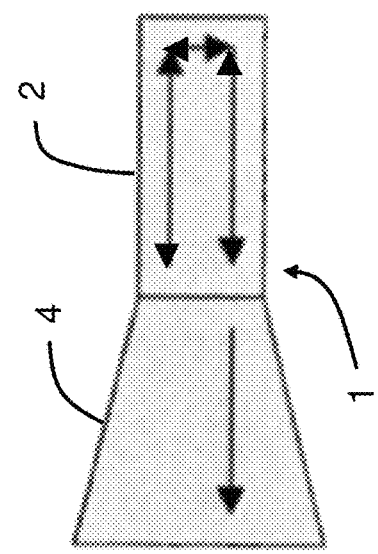
FIG. 1(a) is a schematic plan view of a known optical apparatus having an "in-line" arrangement.

FIG. 1(a) shows a known optical apparatus 1 which includes a laser resonator 2 and a beam expanding telescope 4 which is arranged generally co-linearly with the laser resonator 2 so as to expand a beam of light output from the laser resonator 2.

Similarly, FIG. 1(b) shows a known optical apparatus 10 which includes a laser resonator 12 and a beam expanding telescope 14 which is arranged side-by-side with the laser resonator 12 so as to expand a beam of light output from the laser resonator 12.

FIG. 1(c) shows a first embodiment of an optical apparatus 100 which includes an optical resonator 102 and an optical beam expander 104 which is arranged so as to expand a beam of light output from the optical resonator 102. As described in more detail below, the optical resonator 102 defines an optical resonator path 110 for an optical resonator beam 150 and the optical beam expander 104 defines an optical beam expander path 124 for an optical beam expander beam 152. The optical apparatus 100 of FIG. 1(c) differs from the known optical apparatus 1, 10 shown in FIGS. 1(a) and 1(b) in that the optical resonator path 110 and the optical beam expander path 124 are configured such that the optical resonator beam 150 and the optical beam expander beam 152 at least partially intersect in a region generally designated 130. Consequently, the optical apparatus 100 is relatively compact and, therefore, relatively light-weight compared with the known optical apparatus 1, 10 of FIGS. 1(a) and 1(b).

Figure 2:
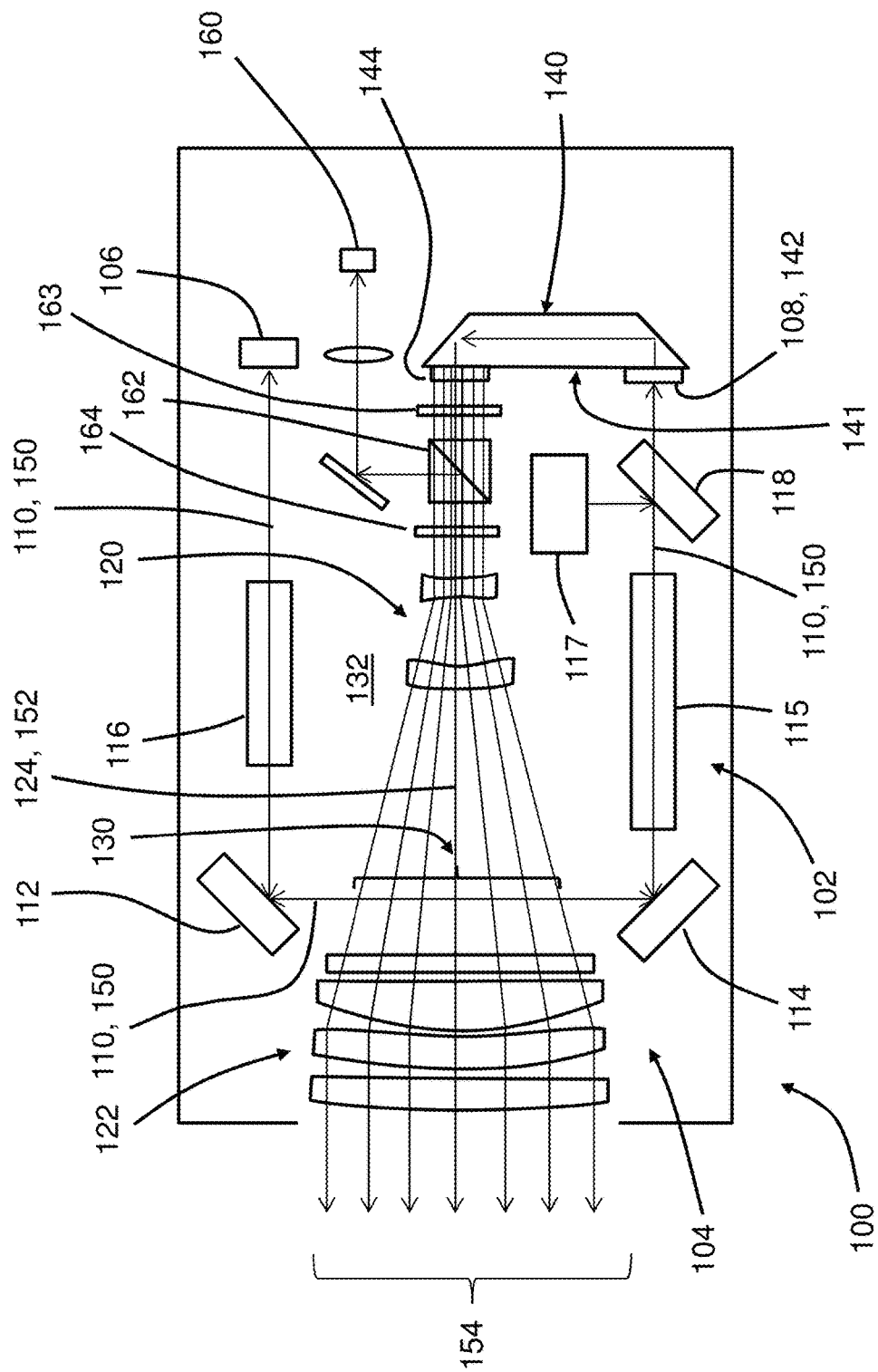
FIG. 2 is a detailed schematic plan view of the first embodiment of the optical apparatus of FIG. 1(c)

FIG. 2 shows the optical apparatus 100 in more detail. The optical resonator 102 includes a high reflector in the form of a highly reflecting mirror 106 located at one end of the optical resonator 102 and an output coupler in the form of a partially reflecting mirror 108 located at the other end of the optical resonator 102. The optical resonator 102 includes a first beam re-directing arrangement in the form of a first beam re-directing mirror 112 and a second beam re-directing arrangement in the form of a second beam re-directing mirror 114. The highly reflecting mirror 106, the partially reflecting mirror 108, and the first and second beam re-directing mirrors 112, 114 together define a "U-shaped" optical resonator path 110 which extends from the highly reflecting mirror 106 to the partially reflecting mirror 108. The first beam re-directing mirror 112 re-directs the optical resonator path 110 through 90° and the second beam re-directing mirror 114 re-directs the optical resonator path 110 through a further 90°. The optical resonator 102 further includes an optical gain medium 115 and a Q-switch 116 located on the optical resonator path 110. The optical apparatus 100 includes an optical pump in the form of a pump laser diode 117 and a pump coupling mirror 118 which is configured to couple light from the pump laser diode 117 into the optical gain medium 115.

The optical beam expander 104 includes an input optical arrangement 120 and an output optical arrangement 122. The input optical arrangement 120 is located on one side of the optical resonator path 110 and the output optical arrangement 122 is located on the other side of the optical resonator path 110. The input optical arrangement 120 and the output optical arrangement 122 together define an optical beam expander path 124 which extends from the input optical arrangement 120 to the output optical arrangement 122. The optical resonator path 110 and the optical beam expander path 124 intersect one another in a region 130.

As shown in FIG. 2, the optical beam expander 104 takes the form of a beam expanding telescope, the input optical arrangement 120 takes the form of an eyepiece lens arrangement of the beam expanding telescope, and the output optical arrangement 122 takes the form of an objective lens arrangement of the beam expanding telescope. The optical apparatus 100 further includes an optical coupling arrangement in the form of a beam folding prism 140 located between the optical resonator 102 and the optical beam expander 104 for folding a beam of light output from the optical resonator 102 through 180°. As will be described in more detail below, the output coupler 108 of the optical resonator 102 is provided integrally with the beam folding prism 140.

The beam folding prism 140 has a front face 141 which defines an input surface area 142 and an output surface area 144 which is coplanar with the input surface area 142. The input surface area 142 is configured so as to define the output coupler 108 of the optical resonator 102. More specifically, the input surface area 142 has a partially reflective coating formed thereon. The output surface area 144 is configured so as to at least partially suppress reflections of the beam of light output from the optical resonator 102. More specifically, the output surface area 144 has an anti-reflective coating formed thereon.

In use, the optical resonator 102 generates an optical resonator beam 150 extending along the optical resonator path 110 between the high reflector 106 and the output coupler 108 and emits an output optical beam from the output coupler 108 which is directed by the beam folding prism 140 to the eyepiece lens arrangement 120 of the optical beam expander 104. The eyepiece lens arrangement 120 creates a divergent optical beam expander beam 152 which travels along the optical beam expander path 124 and at least partially intersects the optical resonator beam 150 in the region 130 before being collimated or focussed by the objective lens arrangement 122 so as to form an output beam 154 which is emitted from the optical apparatus 100. The optical beam expander beam 152 is unaffected by the presence of the optical resonator beam 150 in the region 130.

It will be apparent to one skilled in the art from the foregoing description that the optical resonator 102 is arranged in a "dead-space" 132 extending around the eyepiece lens arrangement 120 of the optical beam expander 104, which space 132 is at least partially defined by, or at least partially delimited by, the optical resonator path 110. This saves space and provides a more compact optical apparatus 100. This may, for example, provide a shorter optical apparatus compared with the "in-line" optical apparatus 1 of FIG. 1(a) and/or may provide a larger ratio of frontal area to optical aperture compared with the "side-by-side" optical apparatus 10 of FIG. 1(b).

The optical apparatus 100 includes an optical detector 160 for detecting light received by the optical apparatus 100 via the objective lens arrangement 122. The light received may, for example, include a portion of the output beam 154 reflected and/or scattered from a target (not shown). The optical apparatus 100 further includes a beam splitter arrangement in the form of a polarising beam splitter 162 located on an optical path between the optical resonator 102 and the optical beam expander 104. The polarising beam splitter 162 is configured to transmit light from the optical resonator 102 towards the eyepiece lens arrangement 120 of the optical beam expander 104 and to direct light received from the eyepiece lens arrangement 120 of the optical beam expander 104 towards the optical detector 160.

The optical apparatus 100 includes a first waveplate 163 located between the optical resonator 102 and the polarising beam splitter 162. The first waveplate 163 defines a retardance which is selected to match a polarisation state of the light output from the prism 140 via the output surface area 144 to a desired polarisation state required for transmission of the light through the polarising beam splitter 162 towards the eyepiece lens arrangement 120 of the optical beam expander 104.

The optical apparatus 100 also includes a second waveplate in the form of a quarter waveplate 164 located between the polarising beam splitter 162 and the eyepiece lens arrangement 120 of the optical beam expander 104. In use, the quarter waveplate 164 may help to ensure that a polarisation state of a portion of the output beam 154 received at the polarising beam splitter 162 after reflection from a target is generally orthogonal to a polarisation state of the light transmitted from the optical resonator 102 to the optical beam expander 104 through the polarising beam splitter 162.

Figure 3:
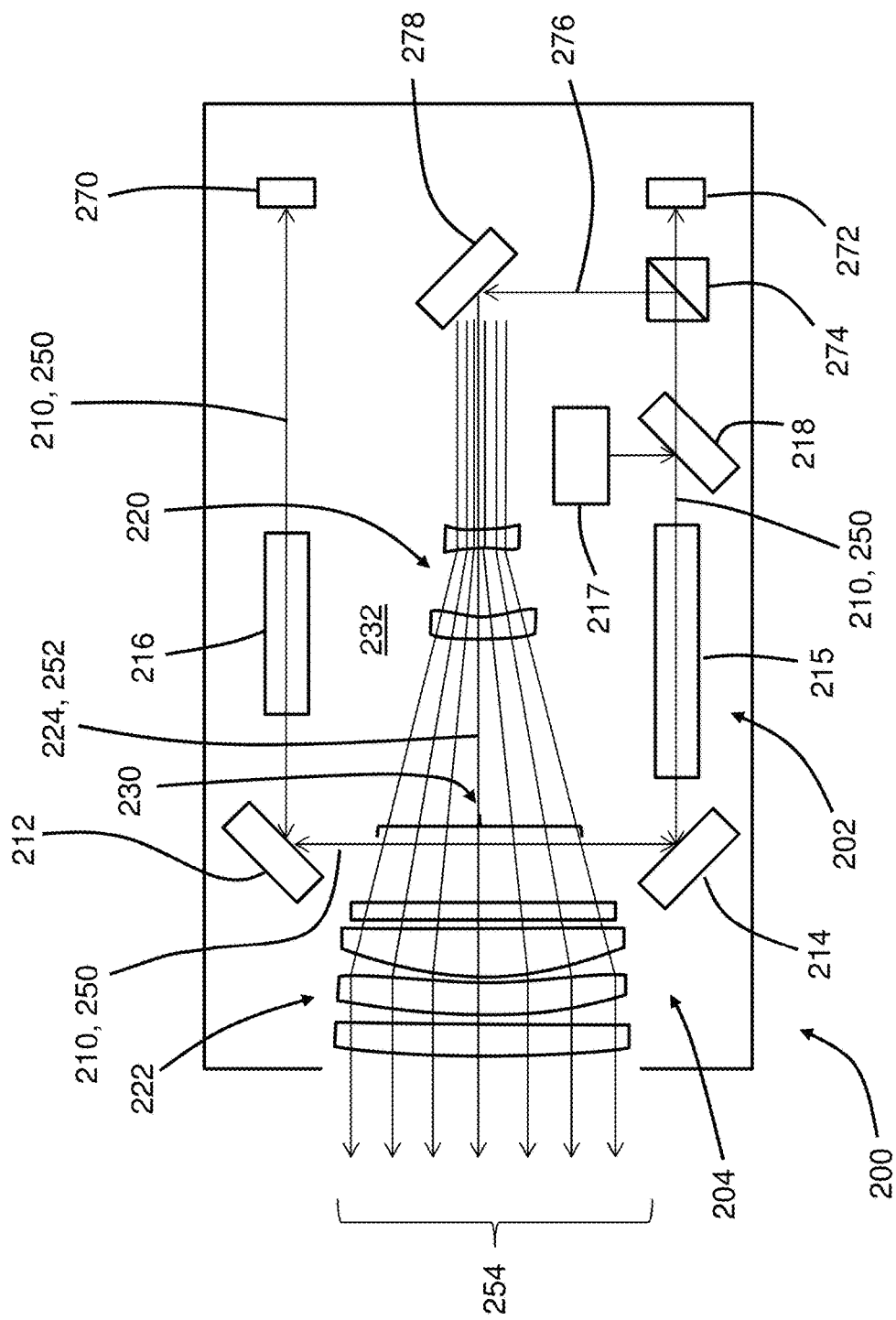
FIG. 3 is a detailed schematic plan view of a second embodiment of an optical apparatus.

FIG. 3 shows a second embodiment of an optical apparatus 200. The optical apparatus 200 of FIG. 3 shares many like features with the optical apparatus 100 of FIG. 2. A feature of the optical apparatus 200 is identified using the same reference numeral as the corresponding feature of the optical apparatus 100 incremented by '100'.

The optical apparatus 200 includes an optical resonator 202 and an optical beam expander 204 which is arranged so as to expand a beam of light output from the optical resonator 202. The optical resonator 202 includes a first Porro prism 270 at a first end and a second Porro prism 272 at a second end. Each of the first and second Porro prisms 270, 272 has a roofline. One of ordinary skill in the art will understand that the roofline of each of the first and second Porro prisms 270, 272 may be arranged at a predetermined angle relative to the roofline of the other of the first and second Porro prisms 270, 272 and/or that the roofline of each of the first and second Porro prisms 270, 272 may be arranged at a predetermined angle relative to a plane of polarisation. For example, the rooflines of the first and second Porro prisms 270, 272 may be arranged so as to be parallel to one another. Alternatively, the rooflines of the first and second Porro prisms 270, 272 may be arranged so as to be perpendicular to one another. The first and second Porro prisms 270, 272 may then said to be "crossed". Alternatively, the rooflines of the first and second Porro prisms 270, 272 may be arranged at an angle of between 0° and 90° relative to one another. One of ordinary skill in the art will also understand that the use of first and second Porro prisms 270, 272 may result in the optical resonator 202 being relatively insensitive to any rotational misalignment of the first and second Porro prisms 270, 272 such that the optical resonator 202 has a relatively high degree of mechanical stability.

The optical resonator 202 further includes a polarising beam splitter 274, a first beam re-directing arrangement in the form of a first beam re-directing mirror 212 and a second beam re-directing arrangement in the form of a second beam re-directing mirror 214. When viewed in plan, the Porro prisms 270, 272, and the first and second beam re-directing mirrors 212, 214 together define a "U-shaped" optical resonator path 210 which extends from the first Porro prism 270 to the second Porro prism 272.

The optical resonator 202 further includes an optical gain medium 215 and a Q-switch 216 located on the optical resonator path 210. The optical apparatus 200 includes an optical pump in the form of a pump laser diode 217 and a pump coupling mirror 218 which is configured to couple light from the pump laser diode 217 into the optical gain medium 215.

In use, an optical resonator beam 250 extends along the optical resonator path 210 and light is output from the optical resonator 202 as a beam 276 at the polarising beam splitter 274. The optical apparatus 200 may include a waveplate (not shown) located on the optical resonator path 210 for controlling the light output from the optical resonator 202.

The optical beam expander 204 includes an input optical arrangement 220 and an output optical arrangement 222. The input optical arrangement 220 is located on one side of the optical resonator path 210 and the output optical arrangement 222 is located on the other side of the optical resonator path 210. The input optical arrangement 220 and the output optical arrangement 222 together define an optical beam expander path 224 which extends from the input optical arrangement 220 to the output optical arrangement 222.

As shown in FIG. 3, the optical beam expander 204 takes the form of a beam expanding telescope, the input optical arrangement 220 takes the form of an eyepiece lens arrangement of the beam expanding telescope, and the output optical arrangement 222 takes the form of an objective lens arrangement of the beam expanding telescope.

The optical apparatus 200 further includes an optical coupling arrangement in the form of a mirror 278. In use, the mirror 278 directs the output optical beam 276 to the eyepiece lens arrangement 220 of the optical beam expander 204. The eyepiece lens arrangement 220 creates a divergent optical beam expander beam 252 which travels along the optical beam expander path 224 and at least partially intersects the optical resonator beam 250 in a region 230 before being collimated or focussed by the objective lens arrangement 222 so as to form an output beam 254 which is emitted from the optical apparatus 200. The optical beam expander beam 252 is unaffected by the presence of the optical resonator beam 250 in the region 230.

The input optical arrangement 220 of the optical beam expander 204 is located within a "dead-space" 232 which is at least partially defined by, or at least partially delimited by, the optical resonator path 210. Consequently, the optical apparatus 200 is relatively compact and, therefore, relatively light-weight compared with the known "in-line" optical apparatus 1 of FIG. 1(a) and the known "side-by-side" optical apparatus 10 of FIG. 1(b).

Figure 4A:
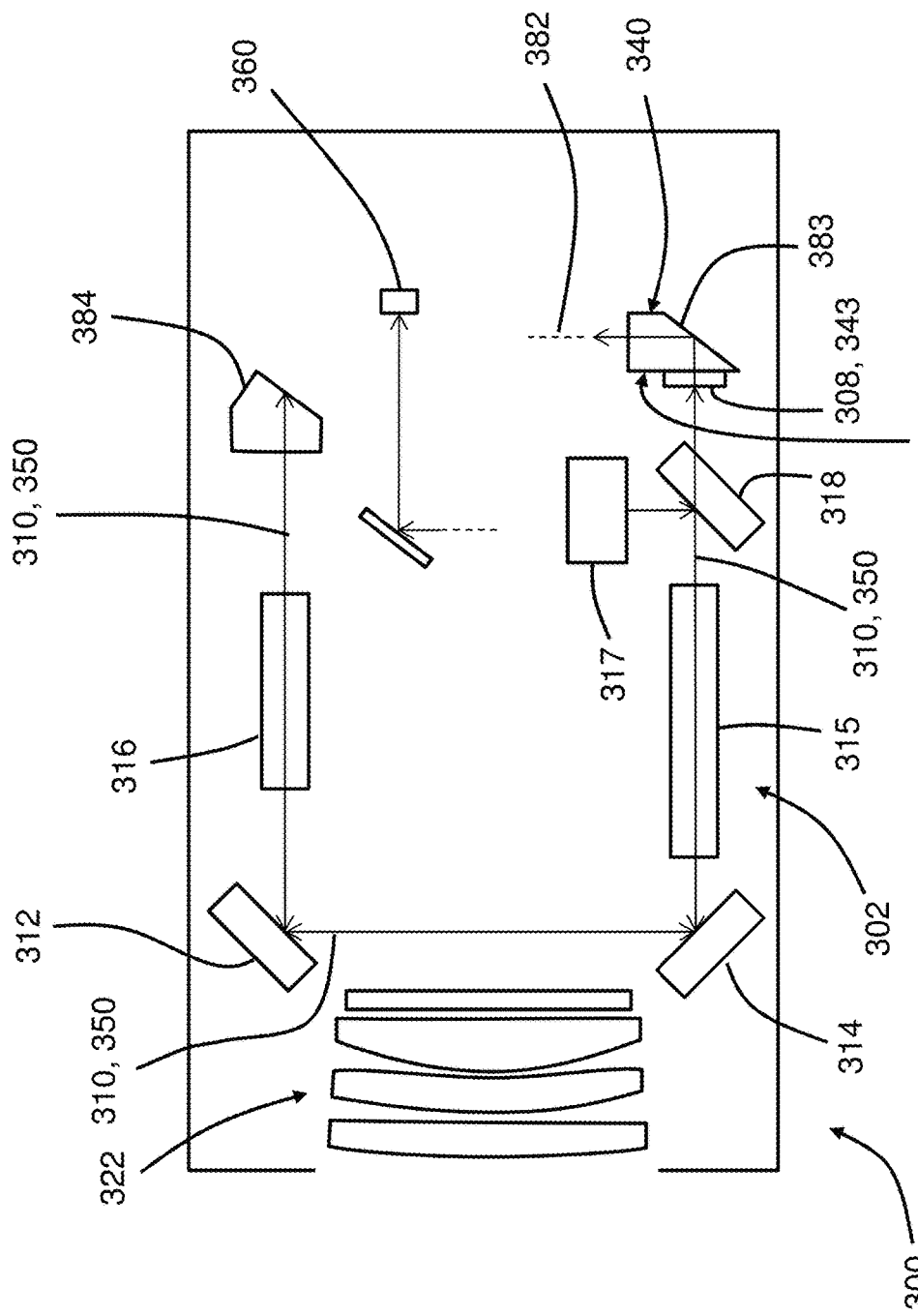
FIG. 4A is a detailed schematic cross-section of a lower layer of a third embodiment of an optical apparatus.
Figure 4B:
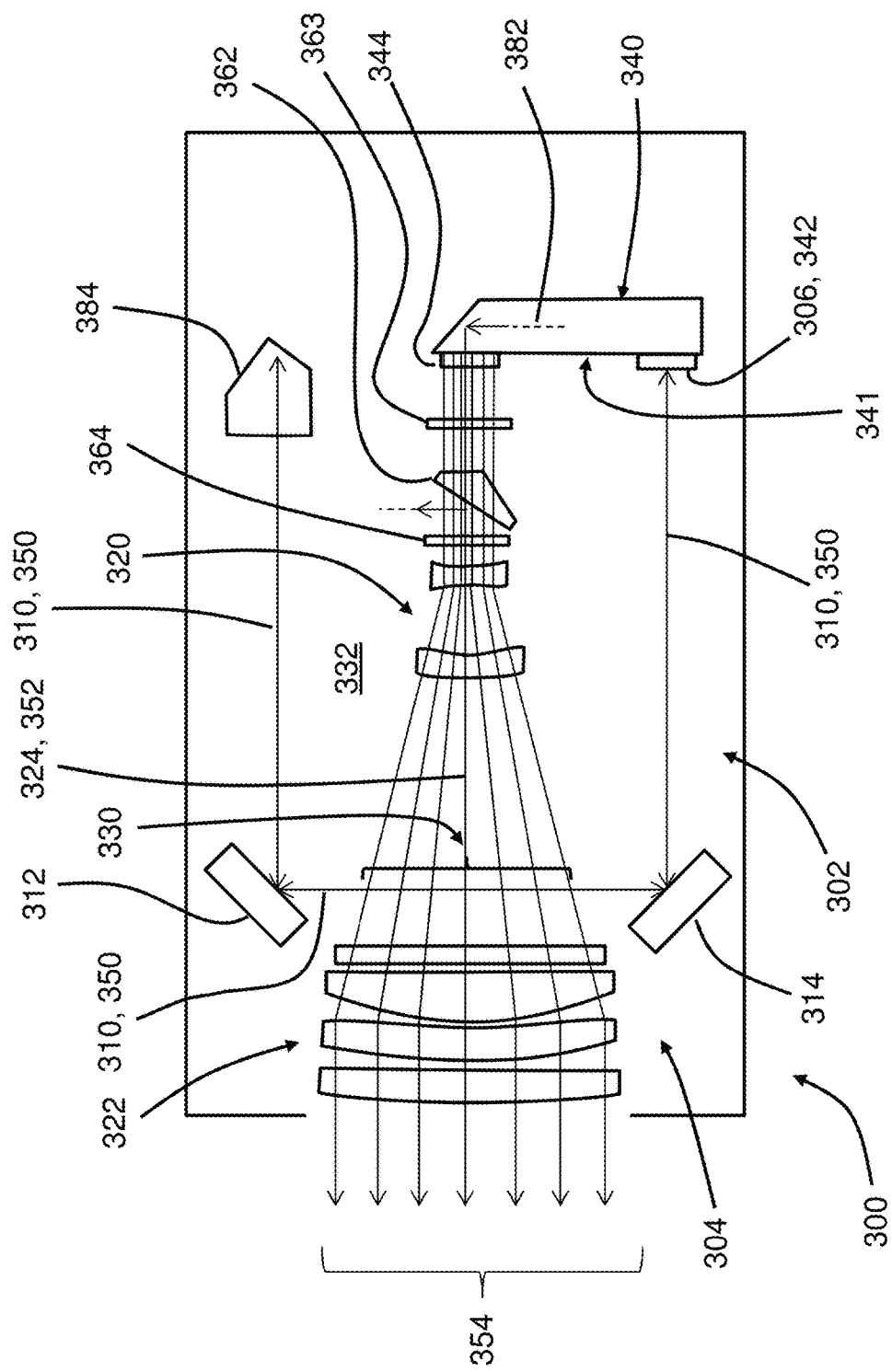
FIG. 4B is a detailed schematic cross-section of an upper layer of the third embodiment of the optical apparatus.

FIGS. 4A and 4B show a third embodiment of an optical apparatus 300. The optical apparatus 300 is arranged across a lower layer shown in FIG. 4A and an upper layer shown in FIG. 4B. The optical apparatus 300 of FIGS. 4A and 4B shares many like features with the optical apparatus 100 of FIG. 2. A feature of the optical apparatus 300 is identified using the same reference numeral as the corresponding feature of the optical apparatus 100 incremented by '200'. The optical apparatus 300 includes an optical resonator generally designated 302 arranged across both the lower layer shown in FIG. 4A and the upper layer shown in FIG. 4B. The optical apparatus 300 further includes an optical beam expander generally designated 304 disposed in the upper layer shown in FIG. 4B. The optical beam expander 304 is configured so as to expand a beam of light output from the optical resonator 302.

The optical resonator 302 is defined between a high reflector in the form of a highly reflecting mirror 306 which is located on the upper layer of the optical apparatus 300 shown in FIG. 4B and an output coupler in the form of a partially reflecting mirror 308 which is located on the lower layer of the optical apparatus 300 shown in FIG. 4A.

The optical resonator 302 includes a prism 340, a retroreflector 384, a first beam re-directing arrangement in the form of a first planar beam re-directing mirror 312, and a second beam re-directing arrangement in the form of a second planar beam re-directing mirror 314. The prism 340, the retroreflector 384, and the beam re-directing mirrors 312, 314 are each common to both the lower and upper layers of the optical apparatus 300 shown in FIGS. 4A and 4B respectively.

The highly reflecting mirror 306 is provided in the form of a highly reflective coating which is deposited or otherwise applied to a first area 342 of a front face 341 of the prism 340. The partially reflecting mirror 308 is provided in the form of a partially reflective coating which is deposited or otherwise applied to a second area 343 of the front face 341 of the prism 340, which second area 343 is coplanar with and located generally below the first area 342 of the front face 341 of the prism 340.

When viewed in plan, the highly reflecting mirror 306, the partially reflecting mirror 308, the retroreflector 384, and the beam re-directing mirrors 312, 314 together define a generally "U-shaped" optical resonator path 310 which extends from the highly reflecting mirror 306 at one end to the partially reflecting mirror 308 at the other end.

The optical resonator 302 further includes an optical gain medium 315 and a Q-switch 316 located on the lower layer of the optical apparatus 300 on the optical resonator path 310. The optical apparatus 300 also includes an optical pump in the form of a pump laser diode 317 and a pump coupling mirror 318 on the lower layer of the optical apparatus 300. The pump coupling mirror 318 is configured to couple light from the pump laser diode 317 into the optical gain medium 315.

In use, an optical resonator beam 350 extends between the highly reflecting mirror 306 located on the upper layer of the optical apparatus 300 shown in FIG. 4B and the partially reflecting mirror 308 located on the lower layer of the optical apparatus 300 shown in FIG. 4A with the retroreflector 384 coupling light vertically between the lower and upper layers of the optical apparatus 300.

One of ordinary skill in the art will understand that, in contrast to the arrangement of the mirrors 106 and 108 of the optical resonator 102 of the optical apparatus 100 of FIG. 2, the arrangement of the optical resonator 302 shown in FIGS. 4A and 4B is such that the coplanar mirrors 306, 308 are opposed by the retroreflector 384. This provides an arrangement which is relatively insensitive to any misalignment between the prism 340 and the retroreflector 384 and which is relatively stable against any relative movement between the prism 340 and the retroreflector 384.

Similarly, in contrast to the arrangement of the mirrors 112 and 114 of the optical resonator 102 of the optical apparatus 100 of FIG. 2, the presence of the planar re-direction mirrors 312, 314 in both the lower and upper layers of the optical resonator 302 as shown in FIGS. 4A and 4B respectively in conjunction with the retroreflector 384 provides an arrangement which is relatively insensitive to any misalignment of either mirror 312 or 314 and which is relatively stable against relative movement of either mirror 312 or 314. More specifically, each planar re-direction mirror 312, 314 re-directs the optical resonator beam 350 through a first angle of 90° when the optical resonator beam 350 is travelling in a forward direction towards the retroreflector 384 in one of the lower and upper layers and re-directs the optical resonator beam 350 through a second angle of 90° when the optical resonator beam 350 is travelling in a reverse direction away from the retroreflector 384 in the other of the lower and upper layers.

With reference to FIG. 4B, the optical beam expander 304 includes an input optical arrangement 320 and an output optical arrangement 322. The input optical arrangement 320 is located on one side of the optical resonator path 310 and the output optical arrangement 322 is located on the other side of the optical resonator path 310. The input optical arrangement 320 and the output optical arrangement 322 together define an optical beam expander path 324 which extends from the input optical arrangement 320 to the output optical arrangement 322.

As shown in FIG. 4B, the optical beam expander 304 takes the form of a beam expanding telescope, the input optical arrangement 320 takes the form of an eyepiece lens arrangement of the beam expanding telescope, and the output optical arrangement 322 takes the form of an objective lens arrangement of the beam expanding telescope.

As described in more detail below, the prism 340 further serves to direct the beam of light 382 output from the optical resonator 302 to the optical beam expander 304. The front face 341 of the prism 340 defines a third surface area 344 which is coplanar with the first and second surface areas 342 and 343 respectively. The third surface area 344 is configured so as to at least partially suppress reflections of the beam of light 382 output from the optical resonator 302. More specifically, the third surface area 344 has an anti-reflective coating formed thereon.

In use, the optical resonator 302 emits an output optical beam from the output coupler 308 which is directed by the prism 340 to the eyepiece lens arrangement 320 of the optical beam expander 304. More specifically, a proportion of the optical resonator beam 350 which is incident upon the partially reflecting mirror 308 is transmitted out of the optical resonator 302 and is reflected from a rear face 383 of the prism 340 from the lower layer of the optical apparatus 300 to the upper layer of the optical apparatus 300 within the prism 340 towards the optical beam expander 304 as represented by the dashed line 382 in FIG. 4A. The eyepiece lens arrangement 320 creates a divergent optical beam expander beam 352 which travels along the optical beam expander path 324 and at least partially intersects the optical resonator beam 350 in a region 330 before being collimated or focussed by the objective lens arrangement 322 so as to form an output beam 354 which is emitted from the optical apparatus 300. The optical beam expander beam 352 is unaffected by the presence of the optical resonator beam 350 in the region 330.

As a consequence of the arrangement of the optical apparatus 300, the input optical arrangement 320 of the optical beam expander 304 is located within a "dead-space" 332 which extends around the eyepiece lens arrangement 320 of the optical beam expander 304 and which is at least partially defined by, or at least partially delimited by, the optical resonator path 310. Consequently, the optical apparatus 300 is relatively compact and, therefore, relatively light-weight compared with the known "in-line" optical apparatus 1 of FIG. 1(a) and the known "side-by-side" optical apparatus 10 of FIG. 1(b).

With reference to FIG. 4A, the optical apparatus 300 further includes an optical detector 360 for detecting light received by the optical apparatus 300 via the objective lens arrangement 322. The light received may, for example, include a reflected portion of the output beam 354 after reflection and/or scattering from a target (not shown). The optical apparatus 300 further includes a beam splitter arrangement in the form of a polarising beam splitter 362 located on an optical path between the optical resonator 302 and the optical beam expander 304. The polarising beam splitter 362 is configured to transmit light from the optical resonator 302 towards the eyepiece lens arrangement 320 of the optical beam expander 304 and to direct light which is reflected from a target (not shown) back through the objective lens arrangement 322 and the eyepiece lens arrangement 320 of the optical beam expander 304 towards the optical detector 360.

With reference to FIG. 4B, the optical apparatus 300 includes a first waveplate 363 located between the prism 340 and the polarising beam splitter 362. The first waveplate 363 defines a retardance which is selected to match a polarisation state of the light output from the prism 340 via the output surface area 344 to a desired polarisation state required for transmission of the light through the polarising beam splitter 362 towards the eyepiece lens arrangement 320 of the optical beam expander 304. The optical apparatus 300 further includes a second waveplate in the form of a quarter waveplate 364 located between the polarising beam splitter 362 and the eyepiece lens arrangement 320 of the optical beam expander 304. In use, the quarter waveplate 364 may help to ensure that a polarisation state of a reflected portion of the output beam 354 received back at the polarising beam splitter 362 after reflection from a target (not shown) is generally orthogonal to a polarisation state of the light transmitted in a forward direction from the optical resonator 302 through the polarising beam splitter 362 on the way to the optical beam expander 304.

One skilled in the art will appreciate that various modifications may be made to the optical apparatus 100, 200 and/or 300 described above. For example, with reference to the optical apparatus 100, whilst the optical resonator beam 150 and the optical beam expander beam 152 at least partially intersect, the optical resonator path 110 and the optical beam expander path 124 may be separated by a gap. As such, whilst the optical resonator beam 150 and the optical beam expander beam 152 at least partially intersect, the optical resonator path 110 and the optical beam expander path 124 may not actually intersect but may appear to cross one another when viewed from a particular direction.

Each beam re-directing mirror 112, 114, 212, 214, 312, 314 may be replaced by a beam re-directing prism such as a right angle prism.

The optical resonator 102 may be or may include a laser of any kind. For example, the optical resonator 102 may be or may include at least one of a pulsed laser, a continuous-wave (CW) laser. The optical resonator 102 may be configured for at least one of Q-switching, gain-switching, and mode-locking.

The optical gain medium 115 may comprise a gaseous medium and/or a solid state medium. The optical gain medium 115 may be configured to be optically and/or electrically pumped.

The Q-switch 116 may include a saturable absorber.

The optical apparatus may comprise a controller configured to analyse a signal provided by the optical detector. Such an optical apparatus may be used to illuminate a target and detect light reflected from the target. The signal provided by the optical detector may be analysed to extract information about the target. For example, the signal provided by the optical detector may be analysed to determine a profile of a surface of the target and/or a distance from the optical apparatus to the target.

The optical beam expander may comprise a boresight adjustment optical element. A boresight adjustment optical element may allow the removal of any boresight errors between the direction of travel of an output beam and an external reference datum such as an external reference datum provided by a mechanical mount used for the laser apparatus.

While certain embodiments have been described, these embodiments have been presented by way of example only, and are not intended to limit the scope of the invention. Indeed, the novel apparatus and methods described herein may be embodied in a variety of other forms. Furthermore, various omissions, substitutions and changes in the form of the apparatus and methods described herein may be made without departing from the spirit of the invention. The accompanying claims and their equivalents are intended to cover such forms or modifications as would fall within the scope and spirit of the invention.

The invention claimed is:

1. An optical apparatus comprising:
    an optical resonator defining an optical resonator path for an optical resonator beam, the optical resonator being configured to emit an optical resonator output beam; and
    an optical beam expander for receiving the optical resonator output beam after emission of the optical resonator output beam from the optical resonator and for expanding the received optical resonator output beam so as to generate a divergent optical beam expander beam, the optical beam expander defining an optical beam expander path for the divergent optical beam expander beam,
    wherein the optical resonator path and the optical beam expander path are configured such that the optical resonator beam and the optical beam expander beam at least partially intersect.

2. An optical apparatus according to claim 1, wherein the optical resonator path and the optical beam expander path define a non-zero angle therebetween.

3. An optical apparatus according to claim 1, wherein the optical resonator path and the optical beam expander path are perpendicular.

4. An optical apparatus according to claim 1, wherein the optical resonator path is geometrically non-linear.

5. An optical apparatus according to claim 1, wherein the optical resonator path is generally U-shaped.

6. An optical apparatus according to claim 1, wherein the optical resonator comprises a high reflector for reflecting the optical resonator beam and, optionally, wherein the high reflector comprises a highly reflecting mirror.

7. An optical apparatus according to claim 1, wherein the optical resonator comprises an output coupler for coupling a proportion of the power from the optical resonator beam so as to form the optical resonator output beam for coupling to the optical beam expander and, optionally, wherein the output coupler comprises at least one of a mirror, a prism, a beam splitter, a polariser and a retarder and, optionally, wherein a reflecting surface of the output coupler is coplanar with a reflecting surface of a high reflector of the optical resonator.

8. An optical apparatus according to claim 1, comprising a retroreflector.

9. An optical apparatus according to claim 1, wherein the optical resonator comprises at least one beam re-direction arrangement for changing a direction of the optical resonator beam and, optionally, wherein each beam re-direction arrangement is refractive and/or reflective and, optionally, wherein each beam re-direction arrangement comprises a mirror or a prism and, optionally, wherein each beam re-direction arrangement re-directs the optical resonator beam through a first angle when the optical resonator beam is travelling in a forward direction and each beam re-direction arrangement re-directs the optical resonator beam through a second angle when the optical resonator beam is travelling in a reverse direction, wherein the second angle is equal to the first angle.

10. An optical apparatus according to claim 1, wherein the optical beam expander comprises an input optical arrangement and an output optical arrangement, wherein the input optical arrangement is optically coupled to the optical resonator so as to receive the optical resonator output beam after the emission of the optical resonator output beam from the optical resonator, and wherein the output optical arrangement is configured for transmission of an optical output beam from the optical apparatus towards an object or a target.

11. An optical apparatus according to claim 10, wherein the input optical arrangement is located within a space which is at least partially defined by, or at least partially delimited by, the optical resonator path.

12. An optical apparatus according to claim 11, wherein the output optical arrangement is located outside the space.

13. An optical apparatus according to claim 10, wherein the input optical arrangement of the optical beam expander comprises an eyepiece lens arrangement and the output optical arrangement of the optical beam expander comprises an objective lens arrangement and/or wherein the optical beam expander comprises a beam expanding telescope and/or wherein the optical beam expander comprises an optical focus adjustment arrangement for adjusting the convergence and/or divergence of an optical output beam emitted by the optical apparatus.

14. An optical apparatus according to claim 1, comprising an optical coupling arrangement between an output of the optical resonator and the optical beam expander for coupling the optical resonator output beam from the output of the optical resonator to the optical beam expander and, optionally, wherein the optical coupling arrangement is configured to image an optical field at an output coupler of the optical resonator to an optical field at an input optical arrangement of the optical beam expander and, optionally, wherein the optical coupling arrangement comprises a beam folding arrangement.

15. An optical apparatus according to claim 14, wherein the optical coupling arrangement is provided separately from an output coupler of the optical resonator.

16. An optical apparatus according to claim 14, wherein the optical coupling arrangement is provided integrally with an output coupler of the optical resonator.

17. An optical apparatus according to claim 1, comprising an optical detector for detecting light received by the optical apparatus and, optionally, comprising a beam splitter arrangement located on an optical path between an output of the optical resonator and the beam expander, wherein the beam splitter arrangement is configured to transmit at least a portion of the light of the optical resonator output beam towards the optical beam expander and to direct at least a portion of the light received from the optical beam expander towards the optical detector and, optionally, wherein the beam splitter arrangement comprises a polarising beam splitter and, optionally, comprising a waveplate located between the output of the optical resonator and the polarising beam splitter, wherein the waveplate defines a retardance which is selected to match a polarisation state of the optical resonator output beam to a desired polarisation state required for transmission of the optical resonator output beam through the polarising beam splitter and, optionally, comprising a quarter waveplate located between the polarising beam splitter and the optical beam expander and, optionally, comprising a controller configured to analyse a signal provided by the optical detector.

18. An optical apparatus according to claim 1, wherein the optical resonator comprises a pair of Porro prisms and a polarising beamsplitter and, optionally, wherein each Porro prism has a roofline and the roofline of each Porro prism is arranged at a predetermined angle relative to the roofline of the other Porro prism or at predetermined angle relative to a plane of polarisation of the optical resonator beam and, optionally, wherein the rooflines of the Porro prisms are arranged so as to be parallel to one another, perpendicular to one another, or at an angle of between 0° and 90° relative to one another.

19. A laser target designator or a laser range finder comprising the optical apparatus of claim 1.

20. An optical apparatus comprising:
an optical resonator defining an optical resonator path for an optical resonator beam, the optical resonator configured to emit an optical resonator output beam; and
an optical beam expander comprising an input optical arrangement which is optically coupled to an output of the optical resonator so as to receive the optical resonator output beam after emission of the optical resonator output beam from the output from the optical resonator,
wherein the input optical arrangement of the optical beam expander is located within a space which is at least partially defined by the optical resonator path.

21. An optical apparatus comprising:
an optical resonator defining an optical resonator path for an optical resonator beam, the optical resonator being configured to emit an optical resonator output beam; and
an optical beam expander for receiving the optical resonator output beam after emission of the optical resonator output beam from the optical resonator and for expanding the received optical resonator output beam so as to generate a divergent optical beam expander beam, the optical beam expander defining an optical beam expander path for the divergent optical beam expander beam, wherein the optical resonator path and the optical beam expander path are configured such that the optical resonator beam and the optical beam expander beam at least partially intersect, and wherein the optical apparatus further comprises an optical coupling arrangement between the optical resonator and the optical beam expander for coupling light output from the optical resonator to the optical beam expander.

* * * * *